United States Patent
Zhou et al.

(10) Patent No.: US 10,194,138 B2
(45) Date of Patent: Jan. 29, 2019

(54) STRUCTURED LIGHT ENCODING-BASED VERTICAL DEPTH PERCEPTION APPARATUS

(71) Applicant: RGBDsense Information Technology Ltd., Ningbo (CN)

(72) Inventors: Yanhui Zhou, Xi'an (CN); Chenyang Ge, Xi'an (CN)

(73) Assignee: RGBDSENSE INFORMATION TECHNOLOGY LTD., Ningbo (CN)

( * ) Notice: Subject to any disclaimer, the term of this patent is extended or adjusted under 35 U.S.C. 154(b) by 282 days.

(21) Appl. No.: 15/174,247

(22) Filed: Jun. 6, 2016

(65) Prior Publication Data
US 2017/0054966 A1    Feb. 23, 2017

(30) Foreign Application Priority Data
Aug. 18, 2015    (CN) .......................... 2015 1 05084402

(51) Int. Cl.
*H04N 13/271*    (2018.01)
*H04N 13/106*    (2018.01)
(Continued)

(52) U.S. Cl.
CPC ......... *H04N 13/271* (2018.05); *H04N 13/106* (2018.05); *H04N 13/254* (2018.05); *H04N 13/257* (2018.05)

(58) Field of Classification Search
CPC ....... G01B 11/002; G01B 11/14; G06F 3/017; G06F 3/015; G01C 15/002; G01S 17/023; G01S 17/66; G06K 9/00335
See application file for complete search history.

(56) References Cited

U.S. PATENT DOCUMENTS

| 2006/0044546 A1* | 3/2006 | Lewin | G01S 17/46 356/4.04 |
| 2014/0327920 A1* | 11/2014 | Bridges | G01B 11/002 356/614 |

(Continued)

FOREIGN PATENT DOCUMENTS

| CN | 103796004 A | 5/2014 |
| WO | 2014081107 A1 | 5/2014 |

OTHER PUBLICATIONS

First Office Action from SIPO for Chinese Patent Application No. 201510508440.2, both in Chinese and English.
(Continued)

*Primary Examiner* — Luke D Ratcliffe
(74) *Attorney, Agent, or Firm* — Dragon Sun Law Firm, P.C.; Jinggao Li, Esq.

(57) ABSTRACT

The present invention discloses a structured light encoding-based vertical depth perception apparatus, the apparatus comprising: a laser pattern projector, an infrared receiving camera, a RGB receiving camera, and a depth perception module; the laser pattern projector, the RGB receiving camera, and the infrared receiving camera are disposed along a straight line vertical to a horizontal plane; the laser pattern projector is for projecting a laser encoded pattern; the infrared receiving camera is for consecutively acquiring the encoded patterns and generating an input encoded image sequence; the RGB receiving camera is for acquiring RGB video stream; and the depth perception module is for generating a depth map sequence. The apparatus according to the present invention may not only generate high-resolution and high-precision depth information in real-time, and but also solve the cavity issue existing at the horizontal direction edge of the to-be-measured object when a horizontal depth perception device performs a depth measurement; besides, it (Continued)

facilitates uniform extraction of the depth map sequence and the to-be-measured object in the RGB video stream.

9 Claims, 4 Drawing Sheets

(51) Int. Cl.
*H04N 13/257* (2018.01)
*H04N 13/254* (2018.01)

(56) References Cited

U.S. PATENT DOCUMENTS

2015/0229911 A1    8/2015   Ge et al.
2015/0312556 A1   10/2015   Cho et al.

OTHER PUBLICATIONS

Second Office Action from SIPO for Chinese Patent Application No. 201510508440.2, both in Chinese and English.

\* cited by examiner

STRUCTURED LIGHT ENCODING-BASED VERTICAL DEPTH PERCEPTION APPARATUS

FIELD OF THE INVENTION

The present invention relates to the technical fields of image processing, natural interaction, and integrated circuits, and specifically relates to a structured light encoding-based vertical depth perception apparatus based on.

BACKGROUND OF THE INVENTION

A natural and harmonious human-machine interaction approach is an ideal objective of human beings in manipulating machines, which enables a machine to understand a command delivered by a person in a natural state. A depth perception technology, as a core technology for human-machine natural interaction, has a wide application prospect in fields such as machine vision, intelligent monitoring, 3D rebuilding, somatosensory interaction, 3D printing, unmanned aerial vehicles, etc. An active visual mode based on structured light encoding may obtain depth information of an image more accurately, e.g., projecting, by infrared laser, an image of fixed mode onto an object surface for encoding; acquiring, by an image sensor, an infrared-encoded image, and then, obtaining depth information of the object through depth perception computation; the generated depth information may be used for real-time identifying a three-dimensional image and capturing actions, such that it becomes possible for a person to interact with a terminal in a natural manner such as expression, gesture, somatosensory action, and the like. Compared with ToF (Time of Flight), the structured light encoding-based three-dimensional depth perception technology has certain advantages in aspects of cost and performance.

Existing three-dimensional depth perception apparatuses are all designed into horizontal apparatuses irrespective of being based on structured-light encoding or ToF, i.e., a base line between a laser projector and a receiving camera is horizontal, and central optical axes thereof are parallel. For example, Microsoft Kinect I (based on PrimeSense Structured Light Module) and Kinect II (based on ToF module), Asus Xtion, Intel RealSense 3D depth camera (ToF module), and a structured light-based three-dimensional depth information real-time obtaining apparatus provided in the Patent "Image Depth Perception Apparatus" (Patent No. ZL201210490225.0). However, by horizontally placing the laser projector and the receiving camera, irrespective of whether the receiving camera is disposed at the left side or right side of the laser projector, a cavitation phenomenon will always occur to one side edge in the left or right direction of a measured object as it is blocked during a process of generating a depth map in the depth perception computation, i.e., an identifiable area of a certain width exists surrounding the edge of the side; moreover, the cavitation phenomenon becomes more apparent at a closer distance from the depth perception apparatus. During a human-machine interaction process using an existing three-dimensional depth perception apparatus, because a to-be-measured object or person generally moves horizontally, the cavitation issue at the edge will seriously affect identifying, partitioning or cutout processing the to-be-measured object, such that it is hard to uniformly extract the to-be-measured object in the depth map and RGB video map.

SUMMARY OF THE INVENTION

In view of the above, the present invention provides a structured light encoding-based vertical depth perception apparatus;

The apparatus comprises: a laser pattern projector, an infrared receiving camera, a RGB receiving camera, and a depth perception module;

The laser pattern projector, the RGB receiving camera, and the infrared receiving camera are disposed along a straight line vertical to a horizontal plane; the depth perception module is connected to the infrared receiving camera;

The laser pattern projector is a laser encoded pattern transmitting module, for projecting a laser encoded pattern;

The infrared receiving camera is for consecutively acquiring laser encoded patterns projected by the laser pattern projector and generating an input encoded image sequence;

The depth perception module is for performing image pre-processing to the input encoded image sequence generated by the infrared receiving camera, and performing block match disparity computation and depth computation in conjunction with a pre-solidified reference encoded image of a known distance, thereby generating a depth map sequence;

The RGB receiving camera is for performing subsequent image processing to the depth map sequence in conjunction with the depth perception module.

DETAILED DESCRIPTION OF THE PREFERRED EMBODIMENTS

Hereinafter, the present invention will be further detailed with reference to the accompanying drawings and preferred embodiments.

In one embodiment, the present invention provides a structured light encoding-based vertical depth perception apparatus;

The apparatus comprises: a laser pattern projector, an infrared receiving camera, a RGB receiving camera, and a depth perception module;

The laser pattern projector, the RGB receiving camera, and the infrared receiving camera are disposed along a straight line vertical to a horizontal plane; the depth perception module is connected to the infrared receiving camera;

The laser pattern projector is a laser encoded pattern transmitting module, for projecting a laser encoded pattern;

The infrared receiving camera is for consecutively acquiring laser encoded patterns projected by the laser pattern projector and generating an input encoded image sequence;

The depth perception module is for performing image pre-processing to the input encoded image sequence generated by the infrared receiving camera, and performing block match disparity computation and depth computation in conjunction with a pre-solidified reference encoded image of a known distance, thereby generating a depth map sequence;

The RGB receiving camera is for performing subsequent image processing to the depth map sequence in conjunction with the depth perception module.

By vertically placing the laser pattern projector, the infrared receiving camera, and the RGB receiving camera, the apparatus according to the present embodiment solves the issue of cavitation generated by a horizontal depth perception apparatus at one side edge in the horizontal direction of a to-be-measured object. The sequence of disposing the laser pattern projector, the infrared receiving camera, and the RGB receiving camera along a straight line vertical to the ground from top to down is not limited here, as long as the infrared receiving camera can acquire a laser encoded pattern projected by the laser image projector.

In the present embodiment, the infrared receiving camera consecutively acquires laser encoded patterns projected by the laser pattern projector at a certain frame frequency, including 30 Hz, 45 Hz, 60 Hz, 100 Hz, and 120 Hz.

More preferably, a consecutive acquisition time interval for the infrared receiving camera to consecutively acquire the laser encoded patterns projected by the laser pattern projector includes 33 ms, 22 ms, 17 ms, 10 ms, and 8 ms, and in one preferred embodiment, 10 ms.

More preferably, the RGB receiving camera is for performing subsequent processing o the depth map sequence in conjunction with the depth perception module, including cutout, 3D scanning, and human face recognition, among other functions.

In one embodiment, the apparatus performs a synchronized control to projection by the laser pattern projector and acquisition by the infrared receiving camera;

A laser encoded pattern projected by the laser pattern projector can be altered, and the horizontal and vertical FoV (Field of View) ranges of the laser encoded pattern projected by the laser pattern projector include 0~180°;

A laser light source of the laser pattern projector includes visible light, infrared, ultraviolet, X-ray.

The laser pattern projector according to the present embodiment is a laser encoded pattern transmitting module; the projected pattern can be fixed or altered by programming.

Preferably, projection by the laser pattern projector and acquisition of encoded images by the receiving camera may be controlled synchronously; further, they may be controlled by computer.

In the present embodiment, the pattern projected by the laser pattern projector has certain horizontal and vertical FoVs, preferably in a range of 0~180°; a laser light source of the laser pattern projector may be visible light, infrared, ultraviolet, X-ray; more preferably, a near-infrared light source is adopted.

In one embodiment, an optical axis of the infrared receiving camera is parallel to an optical axis of the laser pattern projector; a base line distance there between in a vertical direction is S. The base line distance may be tuned according to a working range, depth precision and other requirements of the depth perception apparatus.

The infrared receiving camera is an image sensor comprising an optical focusing imaging lens and a filtering module, for receiving encoded patterns projected by the laser pattern projector within a specific wavelength range. An optical focal length f of the image sensor is generally fixed, whose optical axis is parallel to the optical axis of the laser pattern projector; a base line distance between their optical axes in the vertical direction is S. The infrared receiving camera may be disposed vertically above or under the laser pattern projector.

In one embodiment, the depth perception module comprises an image pre-processing sub-module, a block match disparity computation sub-module, a depth computation sub-module, a storage controller sub-module, and a memory;

One end of the image pre-processing sub-module is connected to an infrared receiving camera; the other end is sequentially connected to the block match disparity computation sub-module and the depth computation sub-module; the storage controller sub-module is connected to the image pre-processing sub-module and the block match disparity computation sub-module; the memory is connected to the storage controller sub-module.

The depth perception module according to the present embodiment may be implemented by hardware or implemented by software programming based on a microprocessor. Its physical carrier may be an integrated circuit block or a microprocessor.

In one embodiment, the image pre-processing sub-module is for performing format conversion, image adaptive denoising, image enhancement, and image binarized processing to the input encoded image sequence or reference encoded image.

By performing pre-processing to the input encoded image sequence or reference encoded image, the image pre-processing submodule according to the present invention makes the image much clearer and reduces noise interference; besides, it facilitates block match disparity computation of the present invention.

In one embodiment, the block match disparity computation sub-module is for performing block match disparity computation to the input encoded image sequence and the reference encoded image;

The block match disparity computation comprises steps of:

S1: extracting an input image block of a fixed size in an input encoded image sequence;

S2: searching an optimal match block in a match searching window of the reference encoded image in accordance with similarity criteria, and an offset amount between the input image block and a central point of the optimal match block is just a disparity corresponding to a central point pixel of the input image block;

S3: repeating step S2, till offset amounts of all pixel points in the input encoded image are computed; generating a disparity map based on the offset amounts of all pixel points.

In step S2 of the present embodiment, the computed disparity corresponding to the central point pixel of the input image block is an offset amount between the input image block and the optimal match block central point. The offset amounts here include horizontal or vertical offset amounts. Specifically, whether to adopt a horizontal offset amount or a vertical offset amount should be determined dependent on a computing result. A single computing result can only be one of horizontal offset amount and vertical offset amount, which will not appear concurrently.

The similarity criteria for determining in the present embodiment refers to determining according to image blocks of a certain size, specifically, including the block matching criteria such as SAD, MAD, MSE, and the like.

The reference encoded images in the present embodiment refer to a set of encoded images formed by first, projecting, by the laser pattern projector, a laser beam (infrared, visible light, UV, invisible light) of a fixed mode onto a plane (the plane may comprise a projection screen fabric, a panel, and etc., for rendering a clear and stable laser image; the plane may also be referred to as a reference base plane) that is vertical to a central axis (Z-axis) of the laser pattern projector or angled fixedly with the central axis of the laser pattern projector and has a known vertical distance of $d_i$, and then being acquired by the receiving camera according to different temperatures and humidity. Generally, the laser pattern projector is parallel to the optical axis of the receiving camera, with a base line there between being S. After being subjected to the same image pre-processing as the input encoded image sequence, the reference encoded images act as a match reference pattern for the input encoded image sequence to perform disparity computation, which may comprise one or more laser encoded images of the same distance.

In one embodiment, the depth computation sub-module computes a corresponding depth value of an input image block in the input encoded image sequence:

$$d' = d - \frac{\Delta m \mu d^2}{fS + \Delta m \mu d} = \frac{fSd}{fS + \Delta m \mu d}$$

Wherein, f denotes focal length of the infrared receiving camera, $\mu$ denotes spot distance of the infrared receiving camera, S denotes a base line distance between the laser pattern projector and the infrared receiving camera, $\Delta m$ denotes an offset amount of the disparity map, and d denotes a known distance parameter of the reference encoded image.

In the present embodiment, a depth value of the entire input encoded image sequence is derived by computing a depth value of the central point of each input image block line by line and point by point.

In one embodiment, the storage controller submodule solidifies the memory, and reads and writes the reference encoded images; the memory is for solidifying the reference encoded images at a known distance; the reference encoded images, after being read out by the storage controller sub-module, are provided to the block match disparity computation sub-module.

In the present embodiment, the storage controller sub-module solidifies the memory, reads and writes the reference encoded images. It may be a Flash controller or an SDRAM/DDR controller.

The reference encoded images in the present embodiment refer to a set of encoded images formed by first, projecting, by the laser pattern projector, a laser beam (infrared, visible light, UV, invisible light) of a fixed mode onto a plane (the plane may comprise a projection screen fabric, a panel, and etc., for rendering a clear and stable laser image; the plane may also be referred to as a reference base plane) that is vertical to a central axis (Z-axis) of the laser pattern projector or angled fixedly with the central axis of the laser pattern projector and that has a known vertical distance of $d_i$, and then being acquired by the receiving camera according to different temperatures and humidity. Generally, the laser pattern projector is parallel to the optical axis of the receiving camera, with a base line therebetween being S. After being subjected to the same image pre-processing as the input encoded image sequence, the reference encoded images act as a match reference pattern for the input encoded image sequence to perform disparity computation, which may comprise one or more laser encoded images of the same distance.

In one embodiment, the horizontal and vertical FoV ranges of the infrared receiving camera and the RGB receiving camera are identical, but less than or equal to the horizontal and vertical FoV range of the laser encoded pattern projected by the laser pattern projector. This is to ensure that the encoded pattern acquired by the infrared receiving camera within the projected range of the laser pattern projector, such that the depth perception module can compute all contents of the depth map corresponding to the input encoded image.

In this embodiment, the horizontal and vertical FoV ranges of the infrared receiving camera are consistent with those of the RGB receiving camera, i.e., 0~180°.

In one embodiment, the subsequent image processing performed by the RGB receiving camera to the depth map sequence in conjunction with the depth perception module includes: cutout, 3D scanning, and human face recognition.

The cutout, 3D scanning, human face recognition technologies in the present embodiment have become mature image processing technologies. The present embodiment focuses on the specific roles played by the RGB receiving camera. Therefore, the cutout, 3D scanning, and human face recognition technologies will not be explained and any prior art applicable to the present invention can be used.

Cutout processing will be taken as an example for explanation. The specific cutout procedure in the present embodiment comprises: identifying a target object (to-be-cutout object) based on a depth image; because the RGB image content acquired according to the present apparatus design has a certain linear mapping relationship with the depth image content, RGB image content of the corresponding target object can be cutout according to the target object content in the depth map. The image cutout processing is widely applied to removing background, extracting content of interest in the image, and other image operations. In a scenario of complex background or weaker luminance, it is hard to automatically implement a cutout operation by software using the RGB camera alone. In the present invention, the cutout operation on the RGB image will be facilitated with the help of depth map.

In one embodiment, the present invention discloses a structured light encoding-based vertical depth perception apparatus, the apparatus comprising: a laser pattern projector, an infrared receiving camera, a RGB receiving camera, and a depth perception module.

Figure 1:
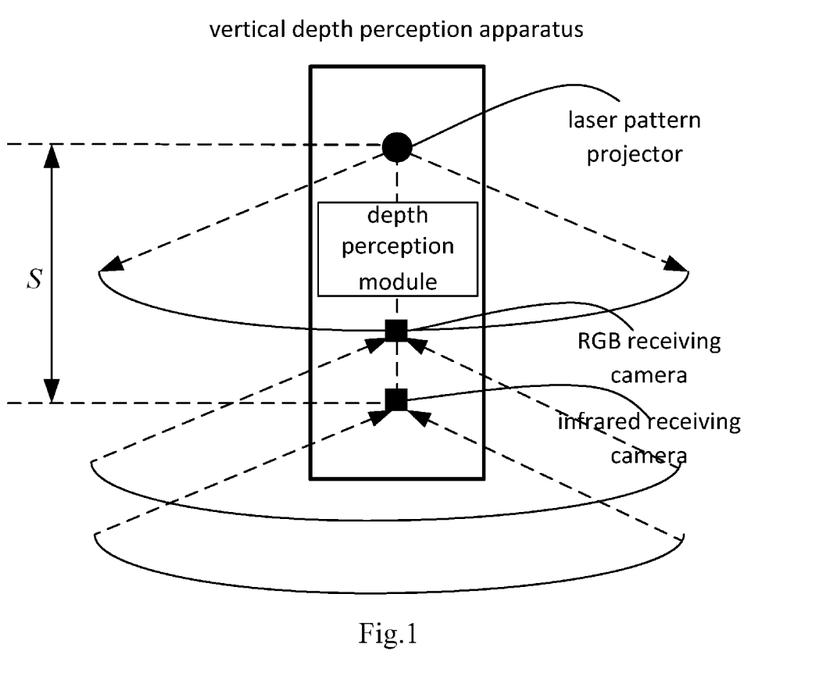
FIG. 1 illustrates a structural diagram of a structured light encoding-based vertical depth perception apparatus in one embodiment of the present invention.

FIG. 1 illustrates a structural diagram of a structured light encoding-based vertical depth perception apparatus in one embodiment of the present invention. In the apparatus, the laser pattern projector, the infrared receiving camera, and the RGB receiving camera are vertically arranged along a vertical direction; an encoding image of a fixed mode is projected by the laser pattern projector; spatial encoding is performed to the projection space and the target object; the infrared receiving camera performs consecutive acquisition to generate an input encoded image sequence; the RGB receiving camera acquires a RGB video stream; the depth perception module performs block match disparity computation and depth computation to the input encoded image sequence in conjunction with pre-solidified reference encoded images of a known distance, to generate a high-resolution, high-precision depth map sequence.

The vertical arrangement manners of the laser pattern projector①, infrared receiving camera②, and RGB receiving camera③ along a vertical straight line include ①③②, ①②③, ②①③, ②③①, ③①②, and ③②① from top to down.

The laser pattern projector is a kind of laser encoded pattern transmitting module. Patterns projected thereby may be fixed or modified by programming. Transmitting by the projector and acquiring encoded images by the receiving camera may be synchronously controlled; the projected pattern has certain horizontal and vertical FoVs; the laser light source may be visible light, infrared, UV, and X-ray; generally, a near-infrared light source is adopted.

The infrared receiving camera is an image sensor comprising an optical focusing imaging lens and a filtering module, for receiving encoded patterns projected by the laser pattern projector within a specific wavelength range. An optical focal length f of the image sensor is generally fixed, whose optical axis is parallel to the optical axis of the laser pattern projector; a base line distance between their optical axes in the vertical direction is S. The infrared receiving camera may be disposed vertically above or under the laser pattern projector.

The RGB receiving camera, which is also an image sensor, comprises an optical focusing imaging lens. Its optical focal length and the horizontal and vertical FoVs are generally identical to the infrared receiving camera; its optical axis is parallel to that of the laser pattern projector and that of the infrared receiving camera, so as to facilitate subsequent image processing between the depth map and the RGB map, e.g., a cutout operation. It may be disposed between the laser pattern projector and the infrared receiving camera, or disposed vertically above or under the infrared receiving camera.

Figure 2:
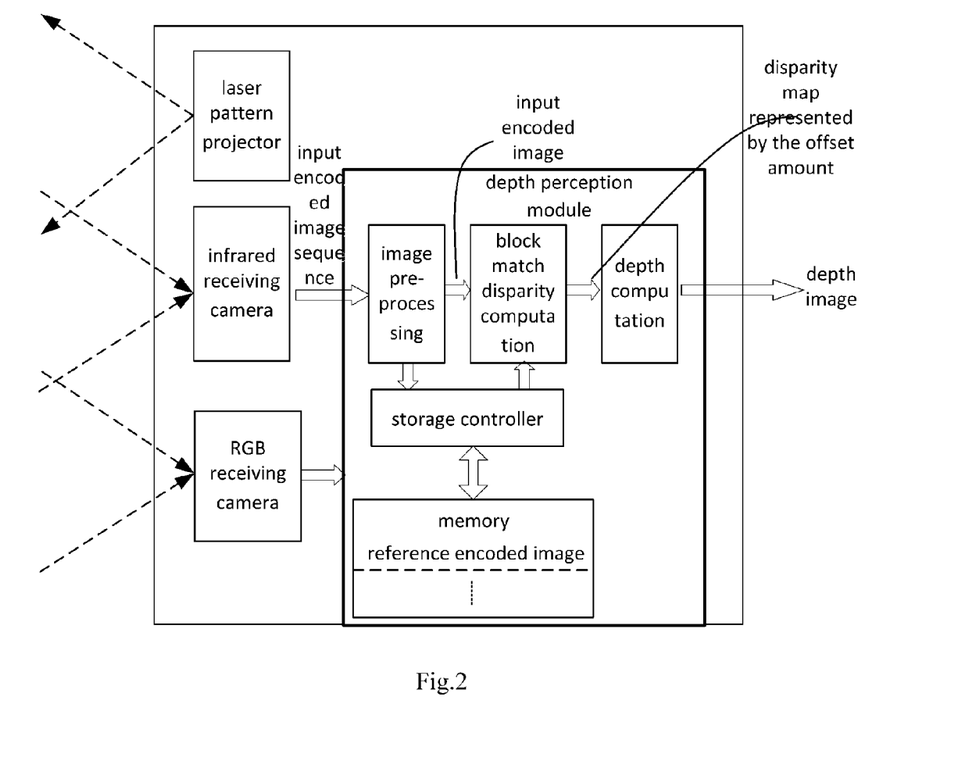
FIG. 2 illustrates a structural diagram of a depth perception module in one embodiment of the present invention.

The depth perception module comprises an image pre-processing sub-module, a block match disparity computation sub-module, a depth computation sub-module, a storage controller sub-module, and a memory. As shown in FIG. 2, the depth perception module may be implemented by hardware, or implemented by software programming based on a microprocessor; its physical carrier may be an integrated circuit or a microprocessor.

wherein, the reference encoded images in the present embodiment refer to a set of encoded images formed by first, projecting, by the laser pattern projector, a laser beam (infrared, visible light, UV, invisible light) of a fixed mode onto a plane (the plane may comprise a projection screen fabric, a panel, and etc., for rendering a clear and stable laser image; the plane may also be referred to as a reference base plane) that is vertical to a central axis (Z-axis) of the laser pattern projector or angled fixedly with the central axis of the laser pattern projector and has a known vertical distance of $d_i$, and then being acquired by the receiving camera according to different temperatures and humidity. Generally, the laser pattern projector is parallel to the optical axis of the receiving camera, with a base line therebetween being S. After being subjected to the same image pre-processing as the input encoded image sequence, the reference encoded images act as a match reference pattern for the input encoded image sequence to perform disparity computation, which may comprise one or more laser encoded images of the same distance.

The image pre-processing sub-module performs, to the input encoded image sequence or the reference encoded images, input video format conversion (e.g., Bayer, ITU601, ITU656, MIPI interface format conversion), chrominance space conversion (e.g., RGB converted to YUV), grayscale image adaptive de-noising and enhancement, grayscale image binarization (represented by 0, 1, wherein 1 corresponds to speckle points), etc. The objective is to make the speckle pattern much clearer and reduce noise interference by pre-processing the encoded images, thereby facilitating block match disparity computation in the present invention.

The block match disparity computation sub-module performs block match disparity computation to the input encoded image sequence and the reference encoded image, i.e., extracting an input image block in the input encoded image; searching an optimal match block in a match searching window of a certain size of the reference encoded image in accordance with similarity criteria, a horizontal or vertical offset amount between the central points of the two being a disparity corresponding to a central point pixel of the input image block; computing the offset amounts of all pixel points per the image block; and finally generating a disparity map represented by the offset amount, for depth perception computation.

The depth computation sub-module computes the depth value d' based on the depth computation equation in conjunction with a focal length f of the infrared receiving camera, spot distance μ of the infrared receiving camera, a base line distance S between the laser pattern projector and the infrared receiving camera, an offset amount Δm (Δx or Δy) of the disparity map, and a known distance parameter d of the reference encoded image:

$$d' = d - \frac{\Delta m \mu d^2}{fS + \Delta m \mu d} = \frac{fSd}{fS + \Delta m \mu d}$$

The storage sub-module is for solidifying reference encoded images of a known distance, which is generally a non-volatile memory, e.g., Flash.

Figure 3:
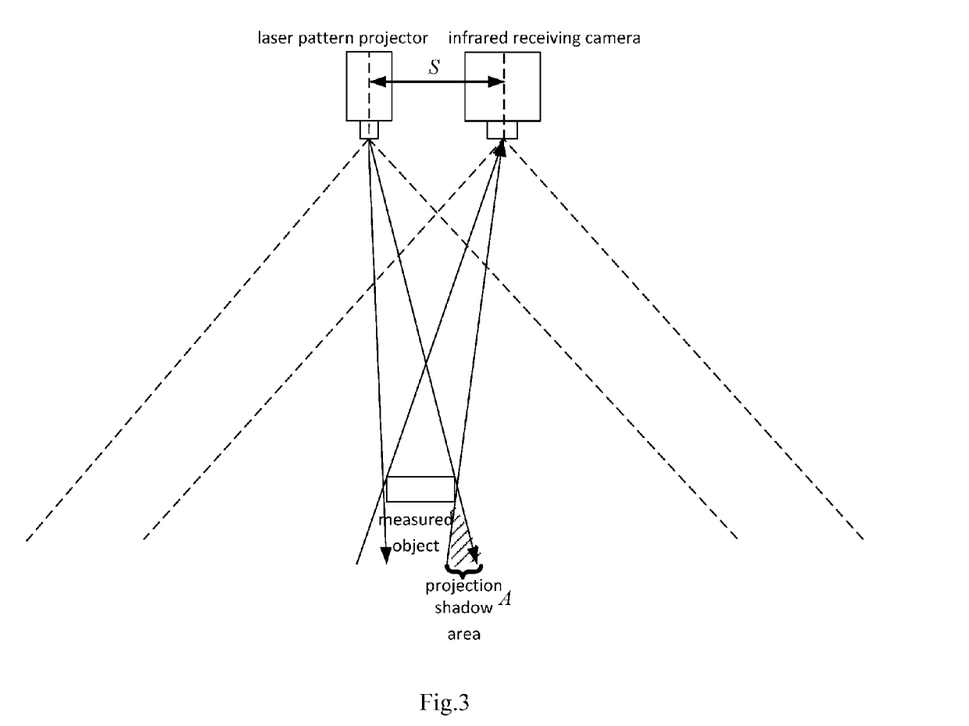
FIG. 3 illustrates a schematic diagram of a cavitation issue existing in a horizontal depth perception apparatus in one embodiment of the present invention.
Figure 4:
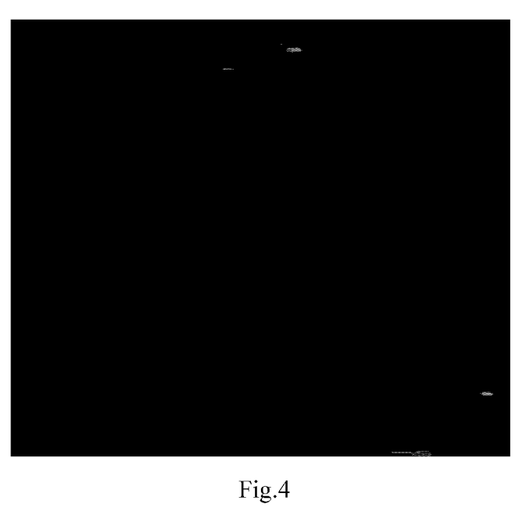
FIG. 4 illustrates a schematic diagram of a depth map cavitation existing in a horizontal depth perception apparatus in one embodiment of the present invention.

The horizontal depth sensing apparatus will cause a cavitation issue at one side edge of a to-be-measured object in a horizontal direction, as shown in the cavitation issue diagram in FIG. 2, where the laser pattern projector and the infrared receiving camera are horizontally placed, and the infrared receiving camera is located at the left side of the projector; during the projection procedure of the laser pattern projector, because an edge of the to-be-measured object is blocked, the projected encoded pattern does not appear at the left and right edges of the to-be-measured object; the infrared receiving camera at its left side may acquire the left side edge area of the to-be-measured object, e.g., the projection shadow area A illustrated in FIG. 3; however, because no projected pattern exists in the area, the area in the input encoded image acquired by the infrared receiving camera is black, which causes that the area in the input encoded image acquired by the infrared receiving camera is black, and finally, the depth perception computing module cannot perform depth computation to that area, such that area A becomes a cavity in the depth map. As shown in the depth map of FIG. 4, the black area is a cavity.

The vertical depth sensing apparatus implemented by the present invention solves the above problem. As shown in FIG. 1, because the laser pattern projector and the infrared receiving camera are vertically arranged, the FoVs of the infrared receiving camera and the projector are substantially identical in the horizontal direction, such that the left and right edges of the to-be-measured object will be blocked; however, the blocked areas are not acquired by the infrared receiving camera, such that projection shadow area similar to FIG. 3 will not be generated in the horizontal direction; therefore, cavity will not be generated in the horizontal direction of the to-be-measured object in the depth map.

As to the vertical depth perception apparatus implemented by the present invention, the image sensor of its infrared receiving camera may adopt a top-to-down point-by-point vertical scanning manner or adopt a horizontal point-point scanning manner: 1) in the case of adopting a top-to-down point-by-point vertical scanning manner, the block match disparity computing submodule of the depth perception module may search an optimal match block in a reference encoded image searching window of a certain size in a horizontal direction, and the finally generated depth map needs to be rotated 90° in a clockwise or counterclockwise direction for being displayed correctly; 2) in the case of adopting a top-to-down point-by-point vertical scanning manner, the block match disparity computing submodule of the depth perception module may search an optimal match block in a reference encoded image searching window of a certain size in a vertical direction, and the finally generated depth map needn't be rotated.

Although the embodiments above are implemented within a specific image, they are not intended to limit the present invention. The present invention may be similarly applied into a similar structured light-encoding image or in other image; the reference encoded images for solidification may be one or more frames; when reading the image, multiple frames may be read out simultaneously; the memory for storing the reference encoded image may be flash or other memory.

The present invention has been detailed above. The present disclosure applies specific examples to illustrate the principle and embodiments of the present invention. The explanations in the above amendments are only for helping understand the method of the present invention and its core idea; meanwhile, to those skilled in the art, the preferred embodiments and the application scope may be altered according to the idea of the present invention. In view of the above the content of the present specification should not be understood as limitation to the present invention.

The invention claimed is:

1. A structured light encoding-based vertical depth perception apparatus, comprising:
  a laser pattern projector;
  an infrared receiving camera;
  a RGB receiving camera; and
  a depth perception module, wherein
  the laser pattern projector, the RGB receiving camera, and the infrared receiving camera are disposed along a straight line vertical to a horizontal plane; the depth perception module is connected to the infrared receiving camera;
  the laser pattern projector is a laser encoded pattern transmitting module, for projecting a laser encoded pattern;
  the infrared receiving camera is for consecutively acquiring laser encoded patterns projected by the laser pattern projector and generating an input encoded image sequence;
  the depth perception module is for performing image pre-processing to the input encoded image sequence generated by the infrared receiving camera, and performing block match disparity computation and depth computation in conjunction with a pre-solidified reference encoded image of a known distance, thereby generating a depth map sequence;
  the RGB receiving camera is for performing subsequent image processing to the depth map sequence in conjunction with the depth perception module;
  the depth perception module comprises an image pre-processing sub-module, a block match disparity computation sub-module, a depth computation sub-module, a storage controller sub-module, and a memory;
  one end of the image pre-processing sub-module is connected to an infrared receiving camera; the other end is sequentially connected to the block match disparity computation sub-module and the depth computation sub-module; the storage controller sub-module is connected to the image pre-processing sub-module and the block match disparity computation sub-module; the memory is connected to the storage controller sub-module.

2. The apparatus according to claim 1, wherein
  the apparatus performs a synchronized control to projection by the laser pattern projector and acquisition by the infrared receiving camera;
  a laser encoded pattern projected by the laser pattern projector can be altered, and the horizontal and vertical FoV (Field of View) ranges of the laser encoded pattern projected by the laser pattern projector include 0~180°; and
  a laser light source of the laser pattern projector includes visible light, infrared, ultraviolet, X-ray.

3. The apparatus according to claim 1, wherein an optical axis of the infrared receiving camera is parallel to an optical axis of the laser pattern projector; a base line distance there between in a vertical direction is S; and the base line distance can be tuned according to a working range, depth precision, and other requirements of the depth perception apparatus.

4. The apparatus according to claim 1, wherein the image pre-processing sub-module is for performing format conversion, image adaptive de-noising, image enhancement, and image binarized processing to the input encoded image sequence or reference encoded image.

5. The apparatus according to claim 1, wherein
  the block match disparity computation sub-module is for performing block match disparity computation to the input encoded image sequence and the reference encoded image;
  the block match disparity computation comprises steps of:
  S1: extracting an input image block of a fixed size in an input encoded image sequence;
  S2: searching an optimal match block in a match searching window of the reference encoded image in accordance with similarity criteria, an offset amount between the input image block and a central point of the optimal match block being a disparity corresponding to a central point pixel of the input image block;
  S3: repeating step S2, till offset amounts of all pixel points in the input encoded image are computed; generating a disparity map based on the offset amounts of all pixel points.

6. The apparatus according to claim 5, wherein the depth computation sub-module computes a corresponding depth value of an input image block in the input encoded image sequence:

$$d' = d - \frac{\Delta m \mu d^2}{fS + \Delta m \mu d} = \frac{fSd}{fS + \Delta m \mu d},$$

wherein f denotes focal length of the infrared receiving camera, μ denotes spot distance of the infrared receiving camera, S denotes a base line distance between the laser pattern projector and the infrared receiving camera, Δm denotes an offset amount of the disparity map, and d denotes a known distance parameter of the reference encoded image.

7. The apparatus according to claim 1, wherein the storage controller sub-module solidifies the memory, and reads and writes the reference encoded images: the memory is for solidifying the reference encoded images at a known distance; the reference encoded images, after being read out by the storage controller sub-module, are provided to the block match disparity computation sub-module.

8. A structured light encoding-based vertical depth perception apparatus, comprising:
a laser pattern projector;
an infrared receiving camera; a RGB receiving camera; and a depth perception module, wherein
the laser pattern projector, the RGB receiving camera, and the infrared receiving camera are disposed along a straight line vertical to a horizontal plane; the depth perception module is connected to the infrared receiving camera;
the laser pattern projector is a laser encoded pattern transmitting module, for projecting a laser encoded pattern;
the infrared receiving camera is for consecutively acquiring laser encoded patterns projected by the laser pattern projector and generating an input encoded image sequence;
the depth perception module is for performing image pre-processing to the input encoded image sequence generated by the infrared receiving camera, and performing block match disparity computation and depth computation in conjunction with a pre-solidified reference encoded image of a known distance, thereby generating a depth map sequence;
the RGB receiving camera is for performing subsequent image processing to the depth map sequence in conjunction with the depth perception module;
the apparatus performs a synchronized control to projection by the laser pattern projector and acquisition by the infrared receiving camera;
a laser encoded pattern projected by the laser pattern projector can be altered, and the horizontal and vertical FoV (Field of View) ranges of the laser encoded pattern projected by the laser pattern projector include 0~180°;
a laser light source of the laser pattern projector includes visible light, infrared, ultraviolet, X-ray; and
the horizontal and vertical FoV ranges of the infrared receiving camera and the RGB receiving camera are consistent, but less than or equal to the horizontal and vertical FoV range of the laser encoded pattern projected by the laser pattern projector.

9. The apparatus according to claim 1,
wherein the subsequent image processing performed by the RGB receiving camera to the depth map sequence in conjunction with the depth perception module includes: cutout, 3D scanning, and human face recognition.

* * * * *